United States Patent [19]

Sasada et al.

[11] Patent Number: 4,946,234
[45] Date of Patent: Aug. 7, 1990

[54] LIGHT BEAM DEFLECTION SCANNING METHOD AND AN APPARATUS THEREFOR

[75] Inventors: Shigeru Sasada; Yoshihiro Kishida, both of Kyoto, Japan

[73] Assignee: Dainippon Screen Mfg. Co., Ltd., Japan

[21] Appl. No.: 193,880

[22] Filed: May 13, 1988

[30] Foreign Application Priority Data

May 13, 1987 [JP] Japan .................................. 62-114705

[51] Int. Cl.$^5$ .............................................. G02F 1/11
[52] U.S. Cl. ...................................... 350/6.6; 350/6.7; 350/358
[58] Field of Search .................. 350/6.8, 6.7, 6.6, 358, 350/6.91, 6.3, 6.4

[56] References Cited

U.S. PATENT DOCUMENTS

| | | | |
|---|---|---|---|
| 4,080,634 | 3/1978 | Schreiber | 358/298 |
| 4,367,926 | 1/1983 | Hohki | 350/358 |
| 4,802,721 | 2/1989 | Fujita et al. | 350/6.8 |
| 4,829,175 | 5/1989 | Goto et al. | 350/6.8 X |

FOREIGN PATENT DOCUMENTS 58-211735 12/1983 Japan .

OTHER PUBLICATIONS

"High-Quality Laser Printing by Wobble Scanning," Blazey and Cates, in Journal of Applied Photographic Engineering, vol. 6, No. 6, pp. 144–146, Dec. 1980.
"Laser Beams Speed Up Reticle Writing", in Electronics, pp. 40–42, Oct. '85.

*Primary Examiner*—Eugene R. LaRoche
*Assistant Examiner*—Nathan W. McCutcheon
*Attorney, Agent, or Firm*—Ostrolenk, Faber, Gerb & Soffen

[57] ABSTRACT

A light beam deflection scanning method including the steps of: (a) finding data for cancelling distortion of a scanning track to be made on a surface of an object by a light beam focussed on the surface by a scanning lens, the distortion being caused by the lens; (b) directing the light beam at the surface through a scanning lens and deflecting the light beam in a main scanning direction; (c) detecting the position of the light beam on the surface; and the deflecting in step (b), deflecting the light beam in a subscanning direction by an amount based on the data, to thereby cancel the distortion of the scanning track.

13 Claims, 7 Drawing Sheets

LIGHT BEAM DEFLECTION SCANNING METHOD AND AN APPARATUS THEREFOR

FIELD OF THE INVENTION AND RELATED ART STATEMENT

The present invention generally relates to a light beam scanning method and an apparatus therefor, and more particularly to a light beam deflection scanning method and an apparatus therefor wherein a scanning light beam is deflected and swept on a surface of an object by a deflector member.

A conventional light beam deflection scanning method and apparatus is disclosed, for example, in U.S. Pat. No. 4,084,634. Generally, a galvanometer mirror, a rotating monogon and polygon mirrors, etc. are employed as the aforementioned deflector member for producing the deflecting scanning in the art. Furthermore, the conventional apparatus includes a $f\theta$ lens, $f\tan\theta$ lens, $\sin^{-1}\theta$ lens or the like as the scanning lens between the deflector member and the surface being scanned.

However, these $f\theta$ lens, $f\tan\theta$ lens, and $\sin^{-1}\theta$ lens produce an undesired bending or distortion of the scanning line tracks made by the light beam on the surface being scanned when the light beam impinges upon the lenses at an angle to a plane that is parallel to the optical axis thereof. Such bending does not occur when the beam is parallel to the optical axis. It is possible to design the beam to impinge upon the scanning lens exactly parallel to the optical axis. However, an extremely high degree of adjustment accuracy is required to do so. This leads to low productivity.

FIG. 7A, in which reference mark Y denotes a main scanning direction and X a subscanning direction, illustrates the straight scanning line tracks drawn on the surface being scanned by light beams that all accurately impinge upon the scanning lens parallel to its optical axis. FIG. 7B depicts the case where two beams impinge upon the lens at an angle with respect to the axis and therefore make tracks having ends outwardly bent or distorted (according to the theory or principle described below). The conditions shown in FIG. 7B result in reproduction images with an undesirable, uneven density.

SUMMARY OF THE INVENTION

With a view to solving the aforementioned difficulties, it is an objective of the present invention to provide a novel and improved light beam deflection scanning method and an apparatus therefor.

It is another objective of the invention to provide a light beam deflection scanning method and an apparatus therefor according to which no bent or distorted scanning line track is produced whatsoever.

In order to accomplish the above objectives, there is provided a light beam deflection scanning method, in accordance with an aspect of the invention, which comprises the steps of: sweeping a focussed light beam by means of a scanning lens along a surface of an object while deflecting said light beam in a main scanning direction; determining an amount of deviation of said beam on said surface from what would be desired, said deviation being caused and specified by the characteristics of said scanning lens; and cancelling said amount of said deviation, by deflecting said light beam in a subscanning direction by an amount corresponding to said amount of said deviation.

In accordance with another aspect of the invention, there is provided a light beam deflection scanning method comprising the steps of: (a) compiling data for cancelling an amount of distortion of a scanning track to be made on a surface of an object to be scanned by a light beam to be focussed on said surface by a scanning lens; (b) directing a light beam at said surface through said scanning lens and deflecting said light beam in a main scanning direction during a predetermined cycle; (c) detecting the position of said light beam on said surface; and (d) during said deflecting in step (b), deflecting said light beam in a subscanning direction by an amount based on said data, thereby cancelling said amount of distortion.

In a preferred embodiment, the data is compiled beforehand and the data corresponds to the angle made by said light beam impinging on said scanning lens with respect to planes that are parallel to an optical axis of said lens.

In another preferred embodiment, the method further comprises the step of reciprocating said light beam in said subscanning direction a predetermined number of times within said cycle during said step (b).

In accordance with still another aspect of the invention, there is provided a light beam deflection scanning apparatus comprising: a light source for emitting a scanning light beam; a scanning lens for focussing said light beam on a surface of an object to be scanned; means for deflecting said light beam in a main scanning direction; and means for deflecting said light beam in a subscanning direction and cancelling an amount of distortion of a scanning track made on said surface by said focussed light beam, said distortion being caused and specified by the characteristic of said scanning lens.

In a preferred embodiment, said deflecting and cancelling means comprises means for determining said amount of said distortion.

In another preferred embodiment, said determining means comprises means for detecting a falling position of said focussed light beam on said surface and outputting data for cancelling distortion corresponding to said detected position.

In still another preferred embodiment, said detecting and outputting means comprises a grating sensor member.

In a further preferred embodiment, said detecting and outputting means comprises a lookup table member for storing therein data (previously determined) for cancelling distortion. Said data corresponding to falling positions of said focussed light beam on said surface.

In a yet further preferred embodiment, said deflecting and cancelling means comprises an acoustooptical modulation member for deflecting said light beam in said subscanning direction by means of an ultrasonic wave.

Hence, since even the light beam that fails to impinge upon the scanning lens parallel to the optical axis thereof is capable of drawing the straight scanning line tracks free of any bending or distortion whatsoever. Thus, the original image can be reproduced with an even density.

BRIEF DESCRIPTION OF THE DRAWINGS

The foregoing and other objectives and attendant advantages of the present invention will be readily appreciated as the same becomes better understood by reference to the following detailed description when considered with the accompanying drawings, wherein.

DETAILED DESCRIPTION OF THE PREFERRED EMBODIMENTS

Described hereunder is a theory or principle explaining why bent or distorted scanning line tracks are made on the surface being scanned based on the characteristics of the scanning lens being utilized when the light beam impinges upon the lens at an angle with respect to planes that are parallel to the optical axis of the lens.

Figure 6:
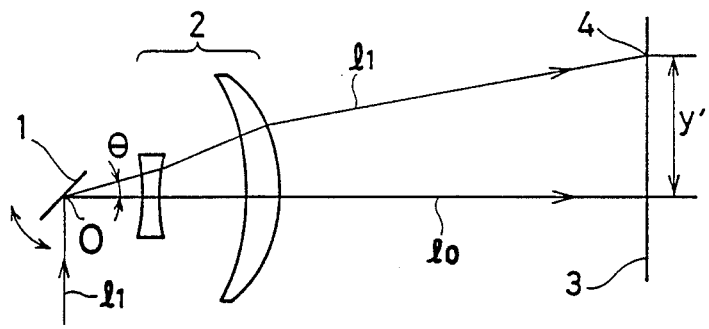
FIG. 6 is a schematic view illustrating the light beam scanning system utilizing a galvanometer mirror.
Figure 7A:
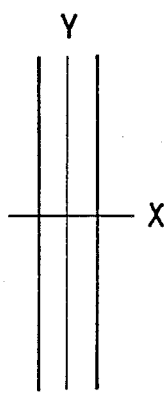
FIGS. 7A and 7B depict scanning line tracks made on a surface being scanned by multiple light beams.
Figure 7B:
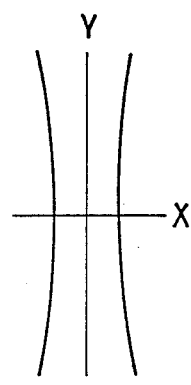

FIG. 6 is a schematic view illustrating the light beam sweeping system utilizing a galvanometer mirror 1 as the deflector member.

A light beam $l_1$, emitted from a light source not shown, impinges upon the mirror 1 as the mirror rotates on an axis perpendicular to the plane of the drawing, and then is reflected by the mirror 1 at point O, so that it is focused onto a surface being scanned 3 through a scanning lens 2. Thus, the beam is swept on the surface 3 as the mirror 1 is rotated.

When the $f\theta$ lens, which is most commonly employed in the art, is applied as scanning lens 2, it exhibits the characteristics according to the following equation:

$$y' = f\theta$$

where f represents a focal length of the lens 2; $\theta$ an angle made by the beam $l_1$ deflected at deflection point O with optical axis $l_0$ of the lens 2; and y' a distance between falling point 4 of the beam $l_1$ on the surface 3 and the optical axis $l_0$ along the surface 3.

Light beams which do not impinge upon the scanning lens parallel to the optical axis thereof will not draw straight scanning line tracks on the surface 3 as demonstrated below.

Figure 8:
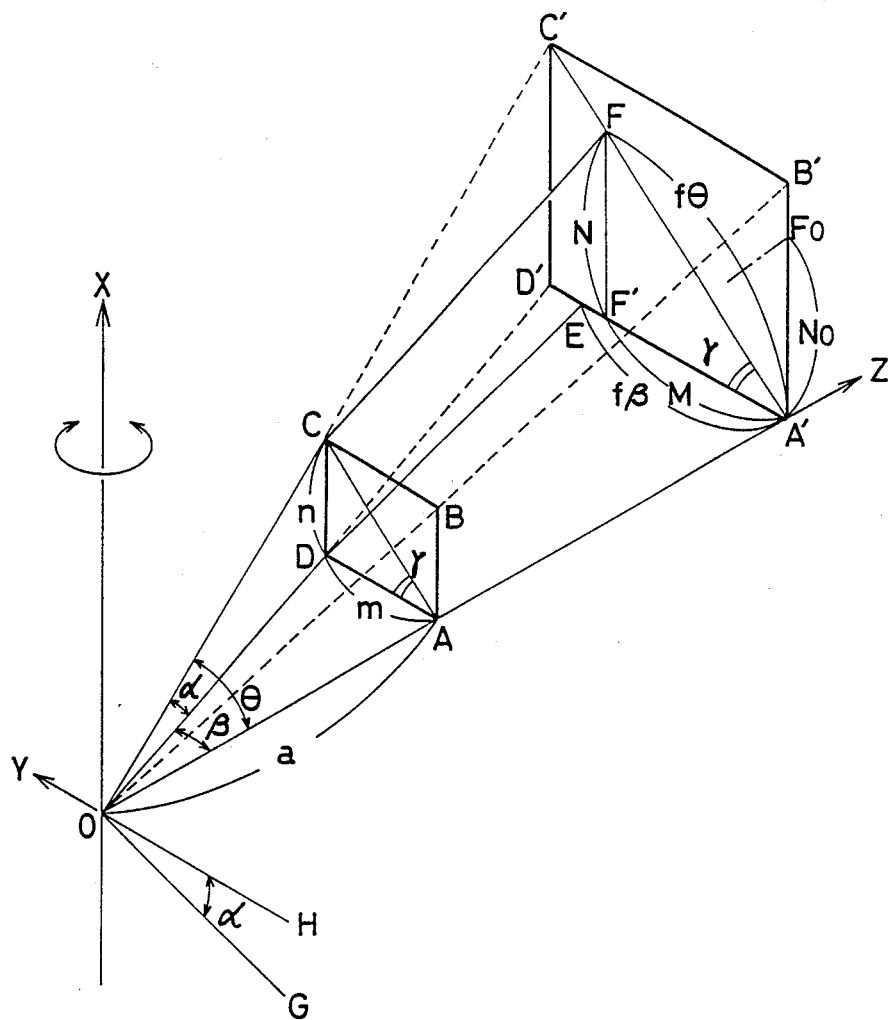
FIG. 8 is a perspective view illustrating optical paths of the scanning optical system.

FIG. 8 is a schematic perspective view depicting optical paths of the light beam sweeping system, by means of an X-Y-Z rectangular coordinate system.

The galvanometer mirror not shown is rotated on the X-axis, and the scanning lens is disposed such that its optical axis coincides with Z-axis. A quadrangle "ABCD" represents part of the principal plane of the lens, while another quadrangle "A'B'C'D'" represents part of the surface being scanned. The two quadrangles are both perpendicular to the optical axis, i.e. Z-axis, and are also analogous to each other.

The main scanning direction of the scanning system is in the Y-axis direction, and points O, A, A', D, D', E, F', and H are all on the Y-Z plane.

A first light beam defined by the points "HODE" impinges upon the galvanometer mirror, and is reflected at the point O on the mirror and deflected in the Y-Z plane, and finally falls on the point E on the surface being scanned. A second beam represented by the points "GOCF" upwardly impinges upon the mirror at an angle of $\alpha$ radian with respect to the Y-Z plane, and is reflected at the point O and falls on the point F. Point F' is an end of a normal vertically extending from the point F to line A'D'.

Then, the following equations established:

$$\tan\alpha = \frac{n\cos\beta}{a} \quad (1)$$

$$\tan\beta = \frac{m}{a} \quad (2)$$

$$\tan\theta = \frac{\sqrt{m^2 + n^2}}{a} \quad (3)$$

$$\tan\gamma = \frac{n}{m} \quad (4)$$

where $\beta$ is an angle made by the first light beam with respect to the optical axis; $\theta$ an angle made by the second light beam with respect to the optical axis; $\gamma$ an angle made by diagonals of the quadrangles "ABCD" and "A'B'C'D'" with respect to the Y-Z plane; m a distance between the points A and D; n a distance between the points C and D; M a distance between the points A' and F'; N a distance between the points F and F'; and a a distance between the points O and A.

When the $f\theta$ lens is applied as the scanning lens, the following equations are established based on its characteristic as aforesaid:

$$M = f\theta \cos \quad (5)$$

$$N = f\theta \sin \quad (6)$$

Substituting for n and m in Eqs. (1) and (2) from Eqs. (3) and (4):

$$\tan\theta = \sqrt{\frac{\tan^2\alpha}{\cos^2\beta} + \tan^2\beta} \quad (7)$$

$$\tan\gamma = \frac{\tan\alpha}{\sin\beta} \quad (8)$$

$$M = f \cdot \left(\tan^{-1}\sqrt{\frac{\tan^2\alpha}{\cos^2\beta} + \tan^2\beta}\right)\cos\left(\tan^{-1}\frac{\tan\alpha}{\sin\beta}\right) \quad (9)$$

$$N = f \cdot \left(\tan^{-1}\sqrt{\frac{\tan^2\alpha}{\cos^2\beta} + \tan^2\beta}\right)\sin\left(\tan^{-1}\frac{\tan\alpha}{\sin\beta}\right) \quad (10)$$

The following tables illustrate the calculation results when values are actually applied in the above equations:

TABLE I

| | When f = 800 mm, and α = 3.27″ | | | |
|---|---|---|---|---|
| β° | M(mm) | M-f (um) | N(um) | N-No(um) |
| 0 | 0 | 0 | 12.683 | 0 |
| 5 | 69.8 | $-1.2 \times 10^{-5}$ | 12.699 | 0.016 |
| 8 | 111.7 | $-1.9 \times 10^{-5}$ | 12.724 | 0.041 |
| 10 | 139.6 | $-2.4 \times 10^{-5}$ | 12.747 | 0.065 |
| 12 | 167.6 | $-2.9 \times 10^{-5}$ | 12.776 | 0.093 |
| 15 | 209.4 | $-3.6 \times 10^{-5}$ | 12.829 | 0.146 |

TABLE II

| | When f = 800 mm, and α = 6.55″ | | | |
|---|---|---|---|---|
| β° | M(mm) | M-f (um) | N(um) | N-No(um) |
| 0 | 0 | 0 | 25.404 | 0 |
| 5 | 69.8 | $-2.3 \times 10^{-5}$ | 25.437 | 0.032 |
| 8 | 111.7 | $-3.8 \times 10^{-5}$ | 25.484 | 0.083 |
| 10 | 139.6 | $-4.7 \times 10^{-5}$ | 25.534 | 0.129 |
| 12 | 167.6 | $-5.7 \times 10^{-5}$ | 25.591 | 0.187 |
| 15 | 209.4 | $-7.1 \times 10^{-5}$ | 25.697 | 0.293 |

TABLE III

| | When f = 800 mm, and α = 122.47″ | | | |
|---|---|---|---|---|
| β° | M(mm) | M-f (um) | N(um) | N-No(um) |
| 0 | 0 | 0 | 475.00 | 0 |
| 5 | 69.8 | $-8.2 \times 10^{-3}$ | 475.60 | 0.60 |
| 8 | 111.7 | $-1.3 \times 10^{-2}$ | 476.54 | 1.55 |
| 10 | 139.6 | $-1.7 \times 10^{-2}$ | 477.42 | 2.42 |
| 12 | 167.6 | $-2.0 \times 10^{-2}$ | 478.49 | 3.49 |
| 15 | 209.4 | $-2.5 \times 10^{-2}$ | 480.47 | 5.47 | where No is a value of N when β = 0 in all the above tables.

As explicit from the above tables, it is appreciated at angles with respect to planes parallel to the at angles of some degrees with planes parallel with the optical axis thereof, fail to draw the straight scanning line tracks even when the generally accepted fθ lens is employed as the scanning lens. This will hold true when the number of impinging light beams is small and even when each light beam is so large in radius that the angle α defined as above is considerably large and hence the value N-No is rather large, not to mention the case where the number of beams is large.

When the same study is made on applications of the ftanθ and sin$^{-1}$θ lenses, it is demonstrated that bending or distortion of the scanning line tracks also takes place. For example, when the ftanθ lens is applied as the scanning lens 2 in the light beam sweeping system shown in FIG. 6, it exhibits the characteristics expressed below:

$$y' = f\tan\theta$$

Further, the following equations are established accordingly:

$$M = f\tan\theta\cos\gamma \quad (11)$$

$$N = f\tan\theta\sin\gamma = f\frac{\tan\alpha}{\cos\beta} \quad (12)$$

$$N - No = f\left(\frac{\tan\alpha}{\cos\beta} - \tan\alpha o\right) \quad (13)$$

Where No is a value of N when β=0, and αo a value of α when β=0.

The following table illustrates calculation results based on the above equations.

TABLE IV

| | When f = 800 mm, and αo = 6.45″ | | | | | |
|---|---|---|---|---|---|---|
| β° | 0 | 3 | 6 | 9 | 12 | 15 |
| N(mm) | 25.0 | 25.03 | 25.14 | 25.31 | 25.56 | 25.88 |
| N-No(mm) | 0 | 0.03 | 0.14 | 0.31 | 0.56 | 0.88 |

Now, referring to the drawings, preferred embodiments of the invention are described below.

FIRST EMBODIMENT

FIG. 1A is a schematic view depicting a multiple light beam deflection exposing scanning system for recording a reproduced image on a photosensitive material according to a first embodiment of the invention, which system is provided with a multiple-light beams producing unit which utilizes an acoustooptical modulator (hereinafter, "AOM") which is actuated by ultrasonic wave signals of different frequencies.

A light beam is emitted by a laser beam source 11, and reduced in radius by a beam condenser 12, and thereafter impinges upon the AOM 13, to which are applied three ultrasonic waves each with a distinct frequency, so that the beam is deflected and caused to travel along three divided optical paths by the AOM in a manner to be described below.

Figure 1:
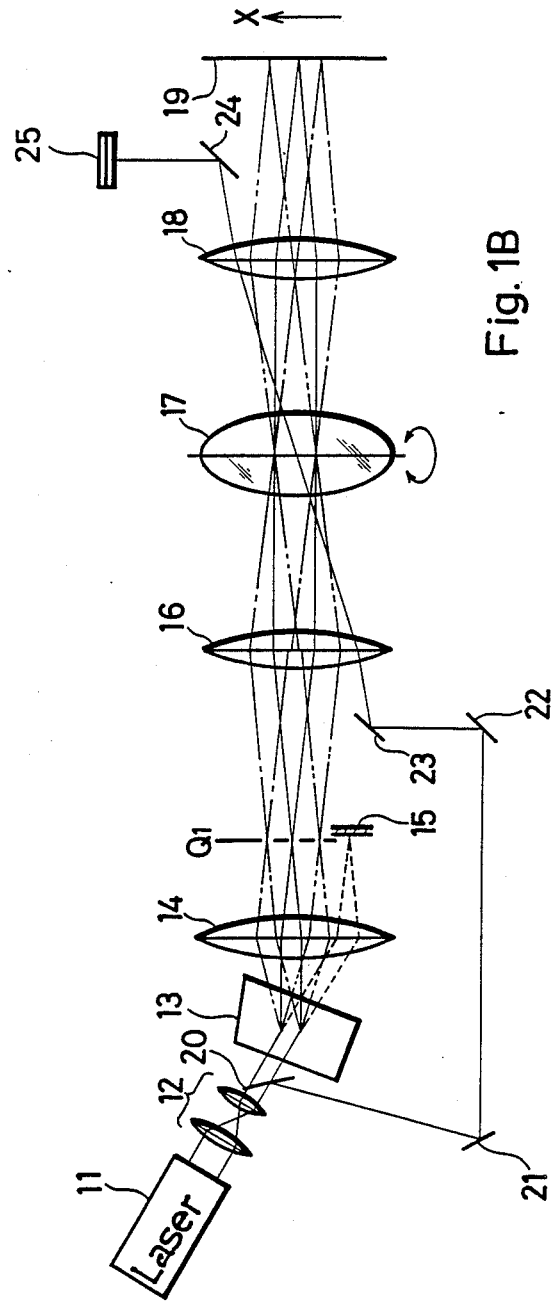
FIG. 1A is a schematic view depicting a multiple light beam deflection scanning system according to a first embodiment of the invention.
FIG. 1B is an enlarged view showing a grating sensor 25 of FIG. 1A.

The lens 14 is disposed at a distance equal to its focal length from the center of the AOM 13, and the light beams in the paths are focussed at back focuses $Q_1$ of the lens 14. In FIG. 1, the optical paths thus formed are distinguishably denoted in solid lines, chain dot lines, and phantom.

A zero-order light beam, as depicted in broken lines in FIG. 1, is shielded by a suitable shutter member 15, whereas three first-order light beams proceed to impinge upon a collimator lens 16 from the positions $Q_1$ and converge upon a galvanometer mirror 17, which rotates upon an axis extending parallel to the plane of the drawing in order to periodically deflect the beams in a direction perpendicular to the plane of the drawing. Thereafter, the light beams impinge upon a scanning lens 18 so that light spots in number equal to the number of the beams are focussed on a photosensitive surface being scanned 19 which is moved in a subscanning direction denoted by an arrow X in FIG. 1A by a moving member not shown. Thus, the beams scan and thereby expose the surface 19 in the direction vertical to the plane of the drawing as the galvanometer mirror 17 is rotated.

Furthermore, a half mirror 20 is provided before the AOM 13 for branching off a subsidiary light beam for the production of timing pulses. The subsidiary light beam is caused to impinge upon the galvanometer mirror 17 (but follows an optical path different from that of the exposing light beams) via mirrors 21, 22, and 23. The subsidiary beam is then reflected by a mirror 24 toward a grating sensor 25 located at a suitable position, thereby yielding timing pulse signals synchronously with the advancing of the main scanning beams.

The grating sensor 25 is formed of a grating and a photoelectric detector equipped therebehind. The grating is assembled of numerous light transmitting and excluding parts alternately disposed at a specified pitch, as shown in FIG. 1B. As the subsidiary light beam runs on the grating sensor 25 in a lengthwise direction synchronously with the main scanning of the exposing light beams, the photoelectric detector outputs pulse signals for every light transmitting part.

As described and demonstrated above, there arises a problem in that bent or distorted scanning line tracks are formed by light beams that impinge upon the scanning lens 18 at angles with respect to the optical axis of the lens when the f$\theta$ lens, ftan$\theta$ lens, sin$^{-1}\theta$ lens, or the like is applied as the scanning lens 18. Accordingly, the system illustrated in FIG. 1A is designed to eliminate such problem by controlling the amount of the deflection for each exposing light beam in the AOM 13, depending upon the falling position of the beam on the surface being scanned 19.

Figure 2:
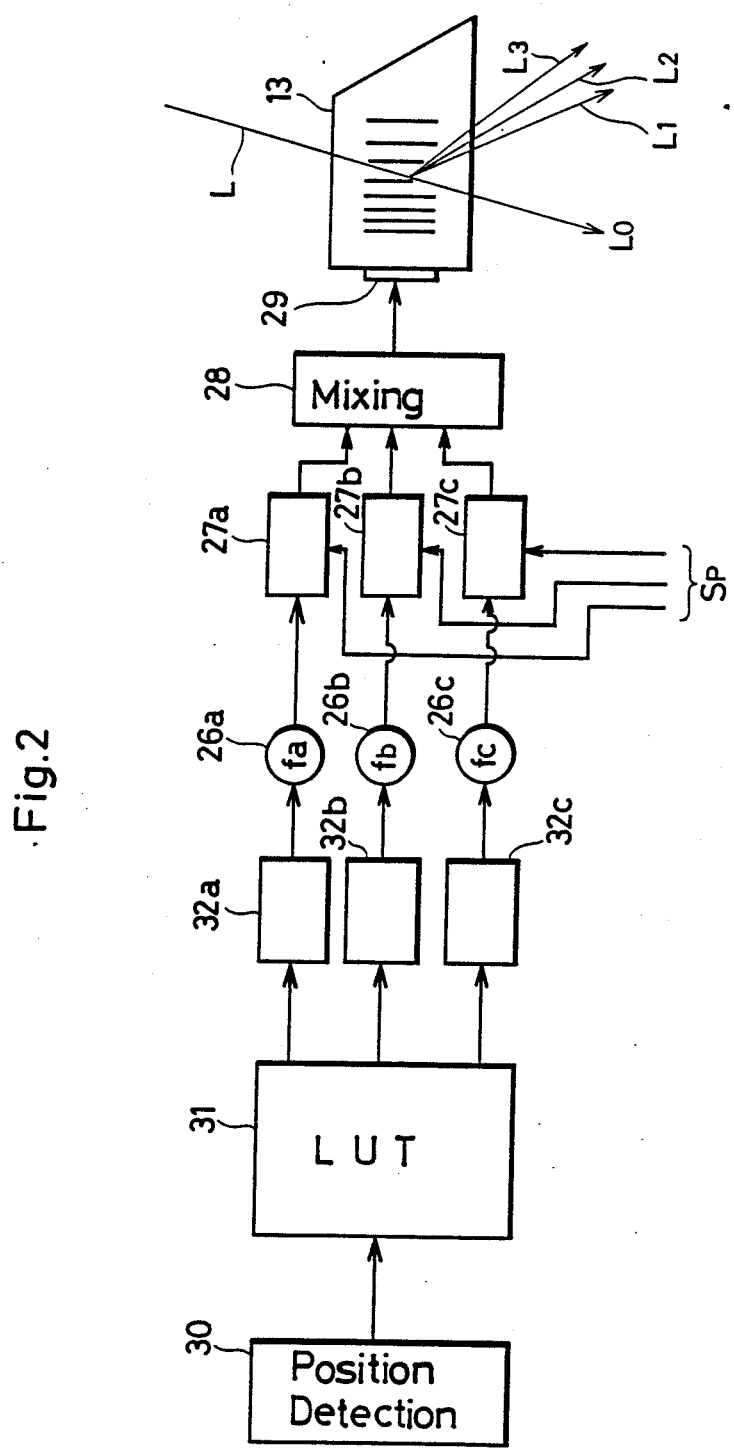
FIG. 2 is a block diagram schematically depicting the deflection control of the light beams.

FIG. 2 is a block diagram schematically explaining the mode or manner in which the single light beam emitted from the laser source 11 is caused to travel along divided optical paths by applying plural types of frequencies to the AOM and at the same time a deflection angle of each of multiple light beams is controlled depending on the main scanning positions of the focussed light spots of the beams on the surface being scanned 19.

A plurality of (three in this embodiment) oscillators 26a, 26b, and 26c are provided for yielding ultrasonic wave signals fa, fb, and fc each having a distinct frequency. The signals fa, fb, and fc are transmitted to corresponding modulation circuits 27a, 27b, and 27c, respectively, and undergo on-off control and amplitude modulation based on image signals Sp that are applied to the circuits 27a, 27b, and 27c, and then inputted parallel to a mixer circuit 28. The circuit 28 synthesizes these signals fa, fb, and fc into a high frequency signal having plural frequency components, and applies the signal to a transducer 29 of the AOM 13. Thus, in the AOM compressed standing waves are formed with pitches corresponding to the frequency components of the ultrasonic wave signal.

If the light beam L is emitted by the laser beam source 11 to the AOM 13, when the AOM 13 has the compressed standing waves produced therein, the beam L is split into a 0-order light beam Lo not diffracted and three first-order light beams $L_1$, $L_2$, and $L_3$ diffracted at angles corresponding to the respective component frequencies. The separation of the light beam into plural beams by the application of plural ultrasonic wave signals to the single AOM is conducted in the manner conventionally known to the art.

Arrangements are provided for altering and adjusting the frequencies yielded by the oscillators 26a through 26c. Specifically, there is provided a light beam position detection circuit 30, a look-up table 31 (hereinafter referred to as "LUT"), and frequency control circuits 32a through 32c respectively corresponding to the oscillators 26a through 26c. The light beam position detection circuits 30 is designed to detect the falling positions of the individual light beams on the surface being scanned 19 on the basis of timing pulses having a suitable pitch that are made by the multiplication of, or the frequency division of, the pulse signals yielded by the grating sensor 25, and to input data concerning such positions to the LUT 31.

In the LUT 31, there is stored modulation data regarding the frequencies to be applied to the AOM 13, which data will be used to correct the amount of deviation (expressed as N-No as aforementioned) of each light beam that does not impinge upon the scanning lens in parallel to the optical axis of the lens, in dependence on the falling position of the beam upon the surface being scanned 19. Such data is predetermined for angles (expressed as $\alpha$ in the foregoing) made by an impinging light beam upon the scanning lens with respect to planes that are parallel to the optical axis of the lens. These angles can be calculated based on the deflection angles of the beams determined in the AOM 13. Consequently, the LUT 31 outputs scanning line distortion correction data concerning exposing light beams to the frequency control circuits 32a through 32c upon receiving the above position data from the detection circuit 30.

Based on the correction data, the control circuits 32a through 32c modulate the frequencies produced by the corresponding oscillators 26a through 26c in order to adjust the deflection angles of the exposing light beams determined by the AOM 13 so that the desired straight scanning line tracks are duly formed by the beams on the surface being scanned 19.

The intervals among the three light beams at the back focuses $Q_1$ of the lens 14 depend upon the deflection angles of the beams created by the AOM 13 as shown in FIG. 1. Further, these deflection angles are governed by the frequencies of the ultrasonic wave signals given to the AOM 13. Suitable selection of the fundamental frequencies of the oscillators 26a through 26c makes it possible to set, as desired, values for the pitches of the beams at the back focuses $Q_1$. Hence, once can determine at will the values of the pitches of scanning lines on the surface being scanned 19. The last mentioned values are governed by the values of the pitches of the beams at the back focuses $Q_1$ and the diameters of the beam spots on the surface 19. Furthermore, properly modulating the frequencies produced by the oscillators 26a through 26c in dependence on the falling positions of the beams on the surface being scanned enables one to correct otherwise bent or distorted scanning line tracks drawn by the beams. Thus whole scanning lines can be made parallel and straight.

The following table illustrates an example of deflection angle adjustment data for cancelling deviation expressed as N-No to correct scanning line tracks made by a light beam into straight tracks when the beam impinges upon the ftan$\theta$ lens at an angle of $\alpha o = 6.45''$ on condition that $f=800$ mm:

TABLE V

| $\beta°$ | 0 | 3 | 6 | 9 | 12 | 15 |
|---|---|---|---|---|---|---|
| $\alpha'$ | 0.9167 | 0.9154 | 0.9116 | 0.9054 | 0.8966 | 0.8854 | where $\alpha' = \tan^{-1}(1.6 \times 10^{-2} \cos\beta)$.

Moreover, the following table shows an example of data concerning the frequencies of the ultrasonic wave signal to be applied to the AOM which assures a properly adjusted deflection angle of a beam that impinges upon an ftan$\theta$ lens at an angle of $\alpha\sigma = 6.45''$ on condition that $f=800$ mm:

TABLE VI

| $\beta°$ | 0 | 5 | 8 | 10 | 12 | 15 |
|---|---|---|---|---|---|---|
| frequency (MHz) | 240 | 239.4 | 238.4 | 237.6 | 236.5 | 234.5 |

Needless to say, the number of the exposing light beams is not limited to that described in this embodiment, and can be freely chosen.

EMBODIMENT II

Figure 3:
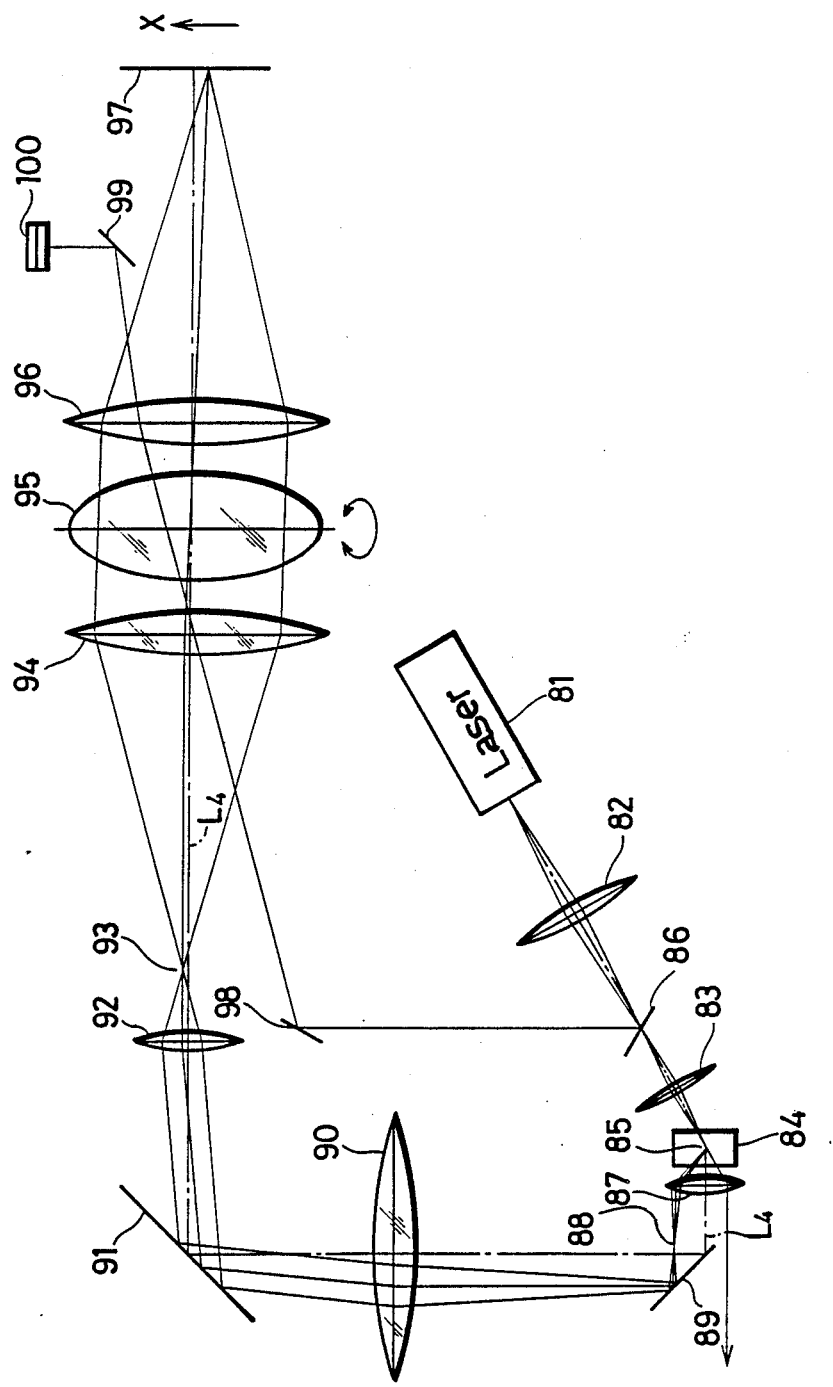
FIG. 3 is a schematic view illustrating a light beam deflection scanning system according to a second embodiment of the invention.

Although in the first embodiment a plurality of parallel light beams are arranged to simultaneously impinge upon the deflector member such as the galvanometer mirror, the present invention is not limited thereto. For example, it is also possible to apply the present invention to so called wobble scanning wherein a light spot of a single scanning light beam moves on the surface being scanned in a subscanning direction in a higher cycle than a cycle in which it moves in a main scanning direction. In wobble scanning, a plurality of scanning lines can be scanned in one main scanning period. FIG. 3 schematically illustrates a second embodiment embodying this concept.

A light beam is emitted by a laser beam source 81 to an AOM 84 through lenses 82 and 83, and a first image 85 thereof is focussed within the AOM 84. Between the lenses 82 and 83, there is disposed a half mirror 86 for branching a subsidiary beam off from the main beam for timing control.

The main light beam is deflected in the AOM 84 at an angle in accordance with the frequency of the ultrasonic wave signal applied to the AOM 84, and directed along the optical axis $L_4$ of a lens 87 positioned at a distance equal to its focal length from the deflection point so as to focus a second image 88 after the beam passes through the lens 87. The beam is then reflected by a mirror 89 and transformed into a parallel luminous flux by a lens 90. Thereafter, the beam is reflected by a mirror 91 and a third image thereof 93 is focussed by a lens 92.

The light beam travelling from the point at which the third image 93 is focussed is again formed into a parallel luminous flux by a collimator lens 94, and impinges upon a galvanometer mirror 95. As in the first embodiment, the galvanometer mirror 95 is rotated on an axis extending parallel to the plane of the drawing in order to periodically deflect the impinging beam in a direction normal to the plane of the drawing. A light spot of the deflected light beam is focussed by a scanning lens 96 on a photosensitive surface 97 which is moved in the subscanning direction X by a moving member not illustrated, and thus the light spot runs on the surface 97 as the galvanometer mirror 95 is rotated.

The branched subsidiary light beam is reflected by a mirror 98 and impinges upon the galvanometer mirror 95 through the collimator lens 94 together with the exposing main light beam. The subsidiary beam is then deflected by the mirror 95 synchronously with the deflection of the exposing beam so as to scan a grating sensor 100 via the scanning lens 96 and a mirror 99, thus yielding timing pulses as in the first embodiment.

From FIG. 3, it is appreciated that the exposing light beam of parallel luminous flux impinges upon the galvanometer mirror 95 at a slight slant angle with respect to optical axis $L_4$ denoted in chain dot lines, and that the amount of the slant angle depends on the distance of the light beam incident on the lens 90 from the optical axis $L_4$ and further that the incident point of the beam on the lens 90 is governed by the deflection angle determined by the AOM 84.

Since the distance of the falling position of the light beam on the surface being scanned 97 from the optical axis $L_4$ along the surface 97 is varied by the amount of the slant angle at which the light beam impinges upon the scanning lens 96 with the optical axis $L_4$ thereof, it is possible to control the focussed point of the light beam on the surface 97 with respect to a direction intersecting the main scanning direction at a right angle (in a direction along the plane of the drawing) by appropriately controlling the deflection angle of the beam in the AOM 84.

Figure 4A:
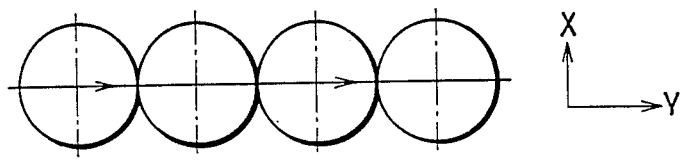
FIGS. 4A through 4C are views depicting scanning line tracks made by the system of FIG. 3.
Figure 4B:
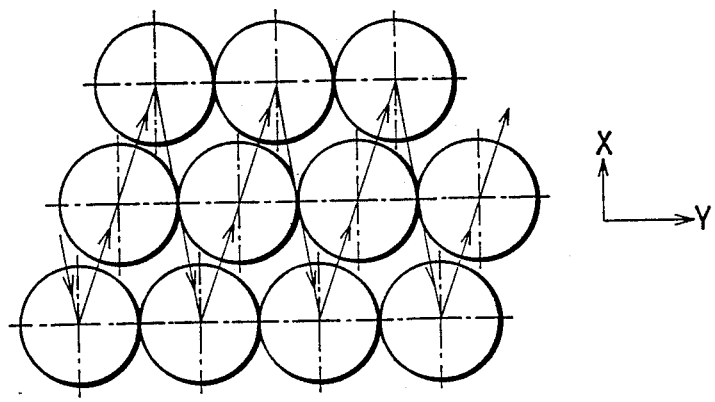
Figure 4C:
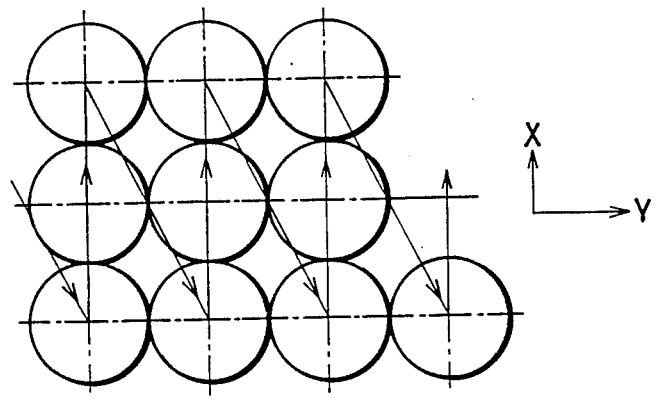

When scanning by deflecting a single beam, the light beam scans the surface to be scanned along only one scanning line in the main scanning direction, as depicted in FIG. 4A. However, according to the conventional wobble scanning technique, altering the deflection angle control signal supplied to the AOM 84 in FIG. 3 to a certain extent permits the light beam to be reciprocally deflected in the subscanning direction in a higher cycle than that in which the galvanometer mirror 95 is rotated. Thus, it is possible for the beam to cover plural main scanning lines during one rotation of the galvanometer mirror 95, as illustrated in FIG. 4B. Furthermore, to attain a similar end, there is provided another AOM in addition to the AOM 84. With the additional AOM, the exposing light beam draws scanning line tracks as shown in FIG. 4C when the AOM 84 is inclined at a certain angle and the additional AOM is disposed at an angle perpendicular to the deflection angle of the light beam specified by the AOM 84. At the same time, distortion of the plural scanning lines caused by the scanning lens can be corrected by adding to the deflection angle control signal that is supplied to the AOM 84 the amount needed to correct and cancel the distortion.

Figure 5:
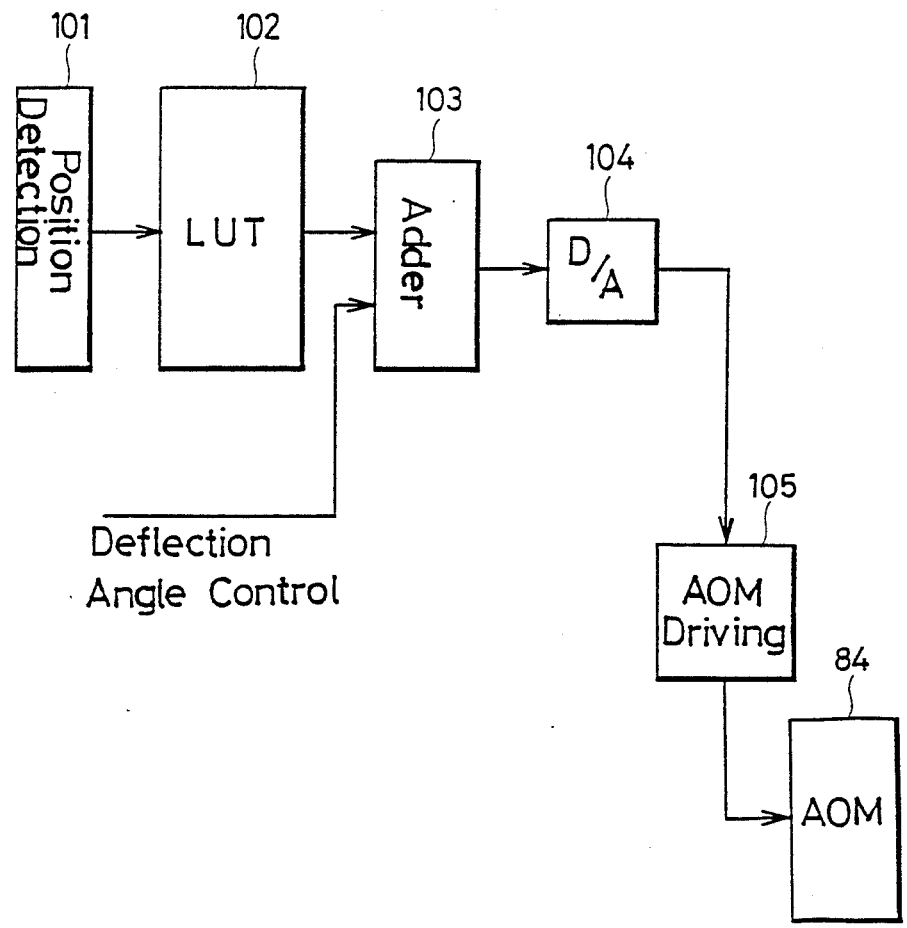
FIG. 5 is a block diagram schematically showing deflection control of a light beam.

FIG. 5 is a block diagram depicting an embodiment of a system for correcting the distortions of the scanning line tracks on the surface being scanned, which system is applicable in the arrangement shown in FIG. 3.

A light beam position detection circuit 101 detects the falling position of the focussed light beam on the surface being scanned 97 based on pulse signals produced by a grating sensor 100, and then delivers data concerning such position to an LUT 102, in the same manner as in the first embodiment.

As in the first embodiment, data is stored in the LUT 102 for use in adjusting the deflection angle of the light beam in the AOM 84 in order to correct the falling position of the beam on the surface 97. The deflection angle is peculiar to the characteristics of the scanning lens being employed. Upon receiving the position data delivered from the detection circuit 101, the LUT 102 outputs distortion correction data respectively corresponding to (1) the falling position of the beam and (2) the angle at which the beam impinges upon the scanning lens with the planes that are parallel to the optical axis of the lens.

The distortion correction data are transmitted to an adder 103 at a stage subsequent to the LUT 102. The adder 103 adds light beam deflection angle control signals to be supplied to the AOM 84. The deflection angle control signals including the proper distortion correction data components are then converted into analog signals by a digital-to-analog converter 104, and then applied to the AOM 84 through an AOM driving circuit 105.

Thus, a single light beam which has undergone modulation by the AOM 84 so given such control signal is capable of drawing on the surface being scanned scanning line tracks all of which are free of any bending or distortion whatsoever.

Unlike the first embodiment, this embodiment can be applied in scanning the image to be reproduced and obtaining image signals thereof as well as in exposing the reproduced image on the photosensitive material. Specifically, since the single light beam is moved at a high speed in the subscanning direction so as to scan a plurality of main scanning lines in one main scanning period and since there is only one scanning light spot, it is possible for the beam to pick up image information of only one pixel at a time in scanning an original image. This permits the application of original image input scanning. In original image input scanning, the original image is placed at a position of the surface 97 of the photosensitive material and light reflected by or penetrating the original image is caused to fall on a photoelectric detector in order to obtain image signals thereof. Thus, the system shown in FIG. 3 can be used for original image input scanning.

Although the galvanometer mirror is utilized for the deflector member in the foregoing embodiments, other devices such as a polygon or monogon mirror can be used as the deflector member.

While the preferred embodiments of the present invention have been described above, it should be understood that various modifications may be made herein without departing from the spirit of the invention and the scope of the appended claims.

What is claimed is:

1. A method, comprising:
   focussing a light beam by means of a scanning lens, sweeping said beam along a surface in a main scanning direction by deflecting said beam, said beam impinging upon said lens at an angle with respect to a plane which is parallel to the optical axis of said lens or which includes said optical axis, said lens causing said beam to deviate in a subscanning direction;
   determining the amount of said deviation; and
   cancelling said deviation by deflecting said beam in said subscanning direction an amount corresponding to said amount of said deviation.

2. A method, comprising:
   (a) compiling data corresponding to angles made by a light beam impinging upon a scanning lens with respect to a plane which is parallel to the optical axis of said lens or which includes said optical axis;
   (b) directing said light beam at a surface through said scanning lens and deflecting said beam in a main scanning direction during a predetermined cycle, said light beam impinging upon said scanning lens at said angles with respect to said plane, said scanning lens causing said light beam to deviate in a subscanning direction;
   (c) detecting the position of said beam on said surface; and
   (d) during said deflecting in step (b), cancelling said deviation by deflecting said light beam in said subscanning direction by an amount based on said data.

3. A method as recited in claim 2, further comprising reciprocating said beam in said subscanning direction a predetermined number of times during said cycle.

4. An apparatus, comprising:
   a light source for emitting a light beam;
   a lens for focussing the beam on a surface of an object, said light beam impinging upon said lens at predetermined angles with respect to a plane which is parallel to the optical axis of said lens or which includes said optical axis, said lens causing distortion of the beam in a subscanning direction;
   first means for deflecting the beam in a main scanning direction to make a scanning track on the surface; and
   second means for deflecting the beam in said subscanning direction to cancel said distortion caused by said lens, said second means comprising means for determining the amount of said distortion in said subscanning direction.

5. An apparatus as recited in claim 4, wherein said determining means comprises means for detecting a position of the beam on the surface and outputting data corresponding to the position.

6. An apparatus as recited in claim 5, wherein said detecting and outputting means comprises a grating sensor member.

7. An apparatus as recited in claim 5, wherein said detecting and outputting means comprises a lookup table member for storing said data therein.

8. An apparatus as recited in claim 4, wherein said second deflecting means comprises an acoustooptical modulation member for deflecting the beam in the subscanning direction by means of an ultrasonic wave.

9. A method as recited in claim 1, wherein the step of determining the amount of the deviation includes determining the angle made by the beam with respect to the plane.

10. A method as recited in claim 9, wherein the step of determining the amount of the deviation includes utilizing parameters based on (1) the characteristics of the lens and (2) the position of the beam on the surface.

11. A method as recited in claim 2, wherein the step of compiling data includes determining the amount of the deviation by utilizing parameters based on (1) the characteristics of the lens and (2) the position of the beam on the surface.

12. An apparatus, comprising:
   a light source for emitting a plurality of light beams which are separated from each other in a subscanning direction;
   first means for deflecting the light beams in a main scanning direction;
   a lens for converging the beams on a surface to make scanning tracks on the surface as the beams are deflected in the main scanning direction, the lens causing distortion of the scanning tracks in the subscanning direction; and
   second means for deflecting the light beams in the subscanning direction to cancel the distortion caused by the lens.

13. An apparatus, comprising:
   a light source for emitting a light beam;
   first means for deflecting the light beam in a main scanning direction during a predetermined cycle and for reciprocating the beam in a subscanning direction a predetermined number of times during the cycle;
   a lens for converging the beam on a surface to make scanning tracks on the surface as the beam is deflected in the main scanning direction and reciprocated in the subscanning direction, the lens causing distortion of the scanning tracks in the subscanning direction; and
   second means for deflecting the light beam in the subscanning direction to cancel the distortion caused by the lens.

* * * * *